Jan. 7, 1958
H. E. BARRETT ET AL
2,818,737
SPHERICAL CONTACT BEARING
Filed Dec. 6, 1951
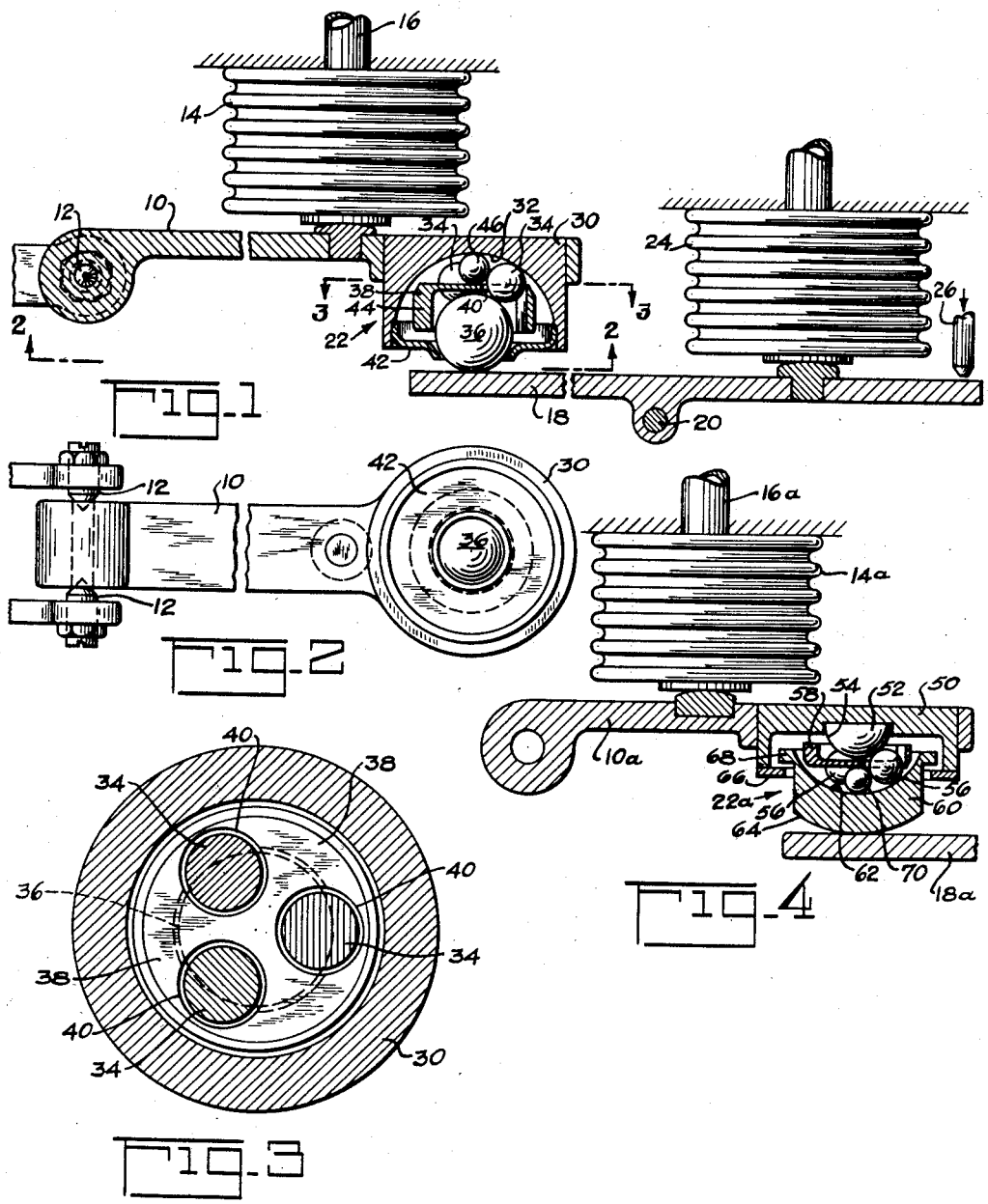
INVENTORS
HILLARD E. BARRETT.
ELIA A. GALLO.
BY
Victor D. Behn
ATTORNEY

United States Patent Office 2,818,737
Patented Jan. 7, 1958

2,818,737

SPHERICAL CONTACT BEARING

Hillard E. Barrett, East Orange, and Elia A. Gallo, Englewood, N. J., assignors to Curtiss-Wright Corporation, a corporation of Delaware Application December 6, 1951, Serial No. 260,288

5 Claims. (Cl. 74—96)

This invention relates to contact bearings and is particularly directed to an improvement in the fluid pressure mechanism disclosed in copending application Serial No. 260,287 filed December 6, 1951, now Patent No. 2,675,818.

Said copending application illustrates a lever mechanism for a force-balanced lever system in which forces are transmitted from one lever to another. For maximum sensitivity of such a balanced mechanism it is essential that the effect of friction on the turning moments acting on the levers be reduced to a minimum. An object of the present invention comprises the provision of a contact bearing for transmitting, with a minimum of friction, a force from one member to another member in which the point of contact of said force on one of said members shifts along said one member in response to relative movement of said members. The contact bearing of the present invention has been designed to replace the contact pins of said copending application. It will be appreciated however that the invention is of general application and can be used in any device for transmitting a force from one member to another without appreciable sliding friction therebetween notwithstanding a small amount of relative movement between said members.

Other objects of the invention will become apparent upon reading the annexed detailed description in connection with the drawing in which:

Fig. 1 is a sectional view illustrating a contact bearing between a pair of levers and embodying the invention;

Figs. 2 and 3 are views taken along lines 2—2 and 3—3, respectively of Fig. 1; and Fig. 4 is a sectional view similar to Fig. 1 but illustrating a modification of the invention.

Referring to the drawing, a first lever 10 is pivotally mounted on trunnions 12 and a fluid pressure bellows 14 is engageable with said lever for applying a turning moment thereto. For this purpose a fluid under pressure may be supplied to the bellows 14 through a passage 16. A second lever 18 is pivotally mounted at 20 and a contact bearing 22 is arranged to apply a force to the lever 18 for exerting a turning moment on said second lever about its pivot axis.

The levers 10 and 18 may comprise part of a force balanced lever system such as illustrated in said copending application. Thus a fluid pressure bellows 24 may act on the lever 18 to balance the turning moment exerted thereon by the contact bearing 22. As in said copending application, one of the levers, such as the lever 18, has a portion which acts as an air baffle controlling the discharge of air from a nozzle 26 in response to pivotal movements of said lever to vary at least one of the turning moments acting on the lever system so as to maintain said turning moments in balance. Accordingly the actual movements of the second lever 18 are quite small. Nevertheless since there must be some movement of the lever 18 relative to the nozzle 26 to maintain the turning moments in balance, the point of contact of the bearing 22 on the second lever 18 shifts slightly along said second lever with movements of said lever.

If there were any appreciable sliding friction between the lever 18 and the contact 22, the force of friction resulting from the small sliding movements of said contact along said lever would also exert a turning moment about the pivot axis of said lever unless the line of action of said friction force passed through said pivot axis. Obviously any such friction turning moment would result in a fluid pressure mechanism, such as illustrated in said copending application, being sluggish. In a compact practical arrangement of the levers of said fluid pressure mechanism it was not found possible to have the line of action of the friction force between each contact pin and its lever pass through the pivot axis of said lever. With the contact bearing construction of the present invention said friction forces and therefore the turning moments exerted by said friction forces are substantially eliminated.

As illustrated in Figs. 1–3, the contact bearing 22 comprises a cup-shaped part 30 secured to the lever 10 and having a concave spherical bottom surface 32. A plurality of spherical balls 34 (preferably three) of equal radius are disposed in contact with the spherical surface 32. A large spherical ball 36 is disposed in contact with the spherical balls 34 and the lever 18. The balls 34 are provided with a floating cage 38 for maintaining the balls 34 in a symmetrically spaced relation. For this purpose the cage 38 has a flat disc-like portion disposed between the large ball 36 and the spherical surface 32 and having three symmetrically spaced holes 40, the walls of each hole 40 surrounding one of the balls 34. A retainer member 42 is secured to and extends across the open end of the cup-shaped part 30 to hold the balls 34 and 36 within said part with the large ball 36 projecting less than half way through an opening in said retainer member. The cage 38 also has an annular flange 44 which cooperates with the retainer member 42 to limit the extent of movement of the balls 34 from the center or bottom of the spherical surface 32 in order that the balls 34 can not move to an extent which would permit the large ball 36 to fall into the cup-shaped member behind the retainer member 42. A relatively small spherical ball 46 may also be provided, said ball 46 being disposed between the balls 34 to limit the extent to which the balls 34 can approach each other.

The radius of the spherical surface 32 is equal to the sum of the diameter of one of the balls 34 and the radius of the large ball 36 whereby the large ball 36 and the spherical surface 32 are concentric when the balls 34 are in contact with the surface 32 and ball 36. With this construction, any relative motion of the levers 10 and 18 results in rolling of the large ball 36 along the lever 18 and this rolling is accompanied by rolling of the balls 34 along the large ball 36 and the spherical surface 32. The only sliding friction resulting from relative motion of the levers 10 and 18 occurs against the cage 38 and/or against the small spacer ball 46. The forces acting against the cage 38 and the small spacer ball 46 are, however, relatively quite small so that the effect of said friction on the turning moments acting on the lever 18 is negligible.

Fig. 4 illustrates a modified construction in which the spherical surface contacting the lever can be increased to provide said contact surface with a substantially larger radius without a corresponding increase in the size of the contact bearing. An increase in the radius of the spherical surface contacting the lever is desirable in order to reduce the contact stress at this point. The structure of Fig. 4 is like that of Fig. 1 except for details of the contact bearing. Accordingly except for details of the contact bearing the parts of Fig. 4 have been designated by the same reference numeral as the corresponding parts of Fig. 1 but with a subscript *a* added thereto.

In Fig. 4, the contact bearing 22*a* comprises a member 50 secured to the lever 10*a* and having a cup-shaped recess at the bottom of which a hemi-spherical part 52 is secured thereby providing said recess with a convex spherical bottom surface 54. A plurality of balls 56 (preferably three) of equal radius are disposed in contact with the spherical bottom surface 54. A cage 58 is disposed about the balls 56 for maintaining said balls in properly spaced relation. An element 60 comprising part of a hollow sphere is disposed between the balls 56 and the lever 18*a*. The inner spherical surface 62 and the outer spherical surface 64 of the element 60 are concentric with said inner surface contacting the balls 56 and with said outer surface contacting the lever 18*a*. A retainer member 66 cooperates with an annular flange 68 on the spherical element 60 to retain the balls 56 and 52 and spherical element 60 within the recess 50. As in Figs. 1–3 a small central ball 70 may also be provided if desired.

The radius of the inner spherical surface 62 is equal to the sum of the diameter of one of the balls 56 and the radius of the convex spherical surface 54 whereby said surfaces are concentric when the balls are in contact therewith. With this construction of Fig. 4, any relative motion of the levers 10*a* and 18*a* results in rolling of the spherical element 60 along the lever 18*a*. This rolling is accompanied by rolling of the balls 56 along the spherical surfaces 54 and 62. Only sliding friction resulting from relative motion of the levers 10*a* and 18*a* occurs against the cage 58 and/or against the small ball 70. The forces acting against the cage 58 and the small ball 70 are very small so that the effect of said friction on the turning moments acting against the levers is negligible as in Figs. 1–3.

For a contact bearing of given overall dimensions, the structure of Fig. 4, as compared with the structure of Fig. 1, provides a spherical contact surface of larger radius thereby reducing the contact stress for a given contact force. Fig. 1, however, comprises the simpler construction.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. A force balanced lever system comprising a pair of relatively movable members at least one of which is a lever; and a contact bearing for transmitting a force between said members; said contact bearing comprising a spherical roller element having rolling point contact with one of said members, means secured to the other of said members and having a spherical surface, a plurality of spaced spherical balls of equal radius disposed between and rollably engaging said element and said spherical surface, and cage means movable with said plurality of balls for maintaining the spacing of said balls while permitting rolling of said balls along said element and surface.

2. A force balanced lever system comprising a pair of relatively movable members at least one of which is a lever; and a contact bearing for transmitting a force between said members; said contact bearing comprising means providing a recess in one of said members having a spherical bottom surface facing the other of said members, a spherical roller element having rolling point contact with said other member and having a portion disposed in said recess, a plurality of spaced spherical balls of equal radius disposed in said recess between and rollably engaging said element and spherical surface, and cage means movable with said plurality of balls and having means disposed between said balls for maintaining their spacing while permitting rolling of said balls along said element and surface and also having means for limiting the range of rolling motion of said balls.

3. A force balanced lever system comprising a pair of relatively movable members at least one of which is a lever; and a contact bearing for transmitting a force between said members; said contact bearing comprising means providing a recess in one of said members and having a concave spherical bottom surface facing the other of said members, a relatively large spherical ball having rolling point contact with said other member and having a portion disposed in said recess, a plurality of spaced spherical balls of equal radius disposed in said recess between and rollably engaging said large spherical ball and said spherical surface, said spherical surface having a radius substantially equal to the sum of the radius of said large ball and the diameter of one of said small balls, and cage means movable with said plurality of small balls and having means disposed between said small balls for maintaining their spacing while permitting rolling of said small balls along said large ball and said concave surface.

4. A force balanced lever system comprising a pair of relatively movable members at least one of which is a lever; and a contact bearing for transmitting a force between said members; said contact bearing comprising a recess in one of said members having a convex spherical bottom surface facing the other of said members, an element constituting a portion of a hollow sphere having a concentric inner and outer spherical surface portions with the outer spherical surface of said element having rolling point contact with said other member, a plurality of spaced spherical balls of equal radius disposed in said recess between and rollably engaging said convex spherical bottom surface and the inner spherical surface of said element, said inner spherical surface having a radius substantially equal to the sum of the radius of said convex spherical surface and the diameter of one of said balls, and cage means movable with said plurality of balls and having means disposed between said balls for maintaining their spacing while permitting rolling of said balls along said inner spherical surface of said element and said convex spherical surface.

5. A contact bearing unit assembly for use in transmitting a force between a pair of relatively movable members; said contact bearing assembly comprising a member to be secured to one of said movable members and having a recess with a spherical bottom surface; a spherical roller element for rollably engaging the other of said movable members, said roller element having a portion disposed in said recess; a plurality of spaced spherical balls of equal radius disposed in said recess between and rollably engaging said element and spherical surface; means secured to said recessed member and projecting part way across the open end of said recess to prevent said element and balls from dropping out; and cage means movable with said plurality of balls and having portions disposed between said balls for maintaining their spacing while permitting rolling of said balls along said element and surface.

References Cited in the file of this patent

UNITED STATES PATENTS

| 1,391,363 | Bozik | Sept. 20, 1921 |
| 2,146,289 | Boyle | Feb. 7, 1939 |
| 2,319,654 | Alder | May 18, 1942 |
| 2,693,708 | Baer | Nov. 9, 1954 |

FOREIGN PATENTS

| 17,886 | Australia | June 7, 1934 |
| 241,230 | Switzerland | Aug. 16, 1946 |